United States Patent
Kaneko

(12) 
(10) Patent No.: US 6,822,685 B1
(45) Date of Patent: Nov. 23, 2004

(54) ELECTRONIC CAMERA

(75) Inventor: Kaoru Kaneko, Kunitachi (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/417,193

(22) Filed: Oct. 12, 1999

(30) Foreign Application Priority Data

Oct. 15, 1998 (JP) ............................................ 10-293644

(51) Int. Cl.$^7$ ............................................. H04N 5/225
(52) U.S. Cl. ...................................... 348/335; 348/374
(58) Field of Search .................................. 348/373–375, 348/340, 344, 335–337, 272, 277, 280, 376; 396/268, 535, 542

(56) References Cited

U.S. PATENT DOCUMENTS

| | | | | |
|---|---|---|---|---|
| 4,829,384 A | * | 5/1989 | Iida et al. .................... | 348/373 |
| 5,038,213 A | * | 8/1991 | Yoda .......................... | 348/376 |
| 5,086,338 A | * | 2/1992 | Usui .......................... | 348/337 |
| 5,606,392 A | * | 2/1997 | Tintera et al. ............... | 348/371 |
| 5,729,291 A | * | 3/1998 | Tanaka et al. ............... | 396/374 |
| 6,037,972 A | * | 3/2000 | Horiuchi et al. ............. | 396/374 |
| 6,115,557 A | * | 9/2000 | Maeda et al. ................ | 396/535 |
| 6,133,951 A | * | 10/2000 | Miyadera ................... | 348/231.99 |

FOREIGN PATENT DOCUMENTS

JP 06-205251 * 7/1994 .......... H04N/5/225

* cited by examiner

*Primary Examiner*—Andrew Christensen
*Assistant Examiner*—Nhan Tran
(74) *Attorney, Agent, or Firm*—Frishauf, Holtz, Goodman & Chick, P.C.

(57) ABSTRACT

An electronic camera has an imaging optical system for taking in a light beam from a subject along a first optical axis, deflecting the light beam along a second optical axis crossing the first optical axis, and focusing the light beam. An image-pickup element is mounted on an image-pickup board. The image-pickup element receives the light beam focused by the imaging optical system, photoelectrically converts the light beam, and thus acquires image data. The image-pickup board is disposed to extend in a plane oblique to a bottom surface of a housing. An input/output terminal for detachably attaching a cable for electrical connection with an external device is disposed in a space defined between the image-pickup board and the bottom surface of the housing.

33 Claims, 4 Drawing Sheets

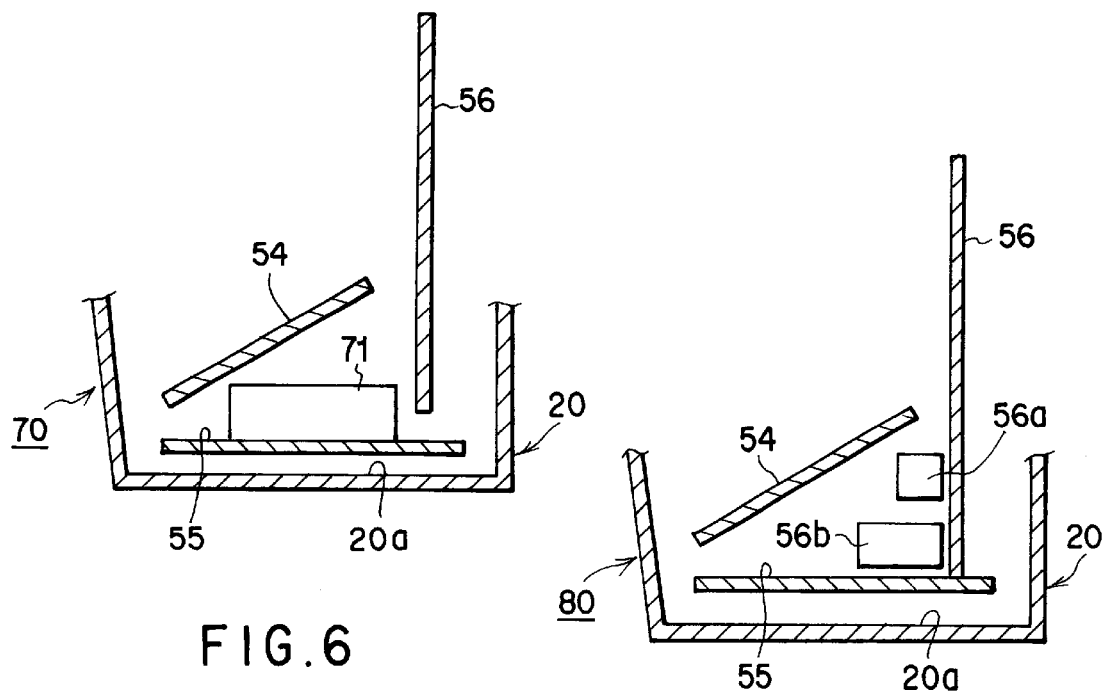
FIG. 6
FIG. 7
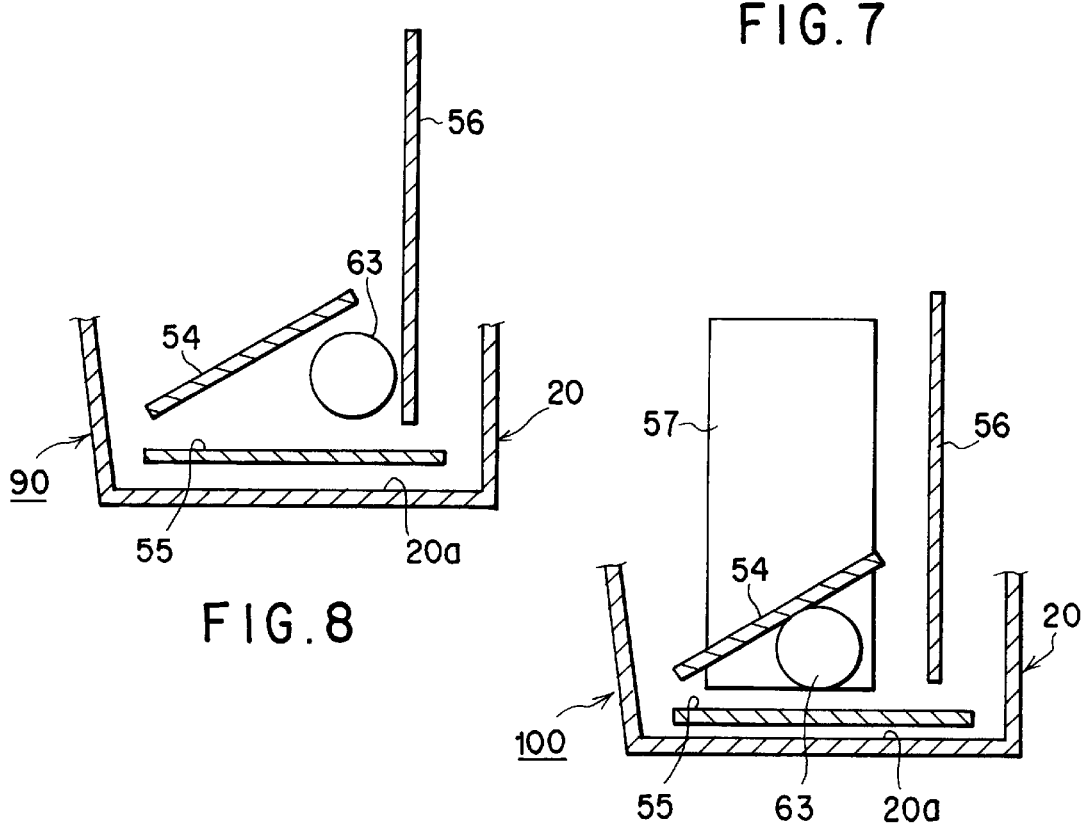
FIG. 8
FIG. 9

ELECTRONIC CAMERA

BACKGROUND OF THE INVENTION

The present invention relates generally to an electronic camera and more particularly to a technique for effectively using an internal space within an electronic camera.

In the case of an electronic camera using a photoelectric conversion image-pickup element such as a CCD element, the optical axis for image pickup can be deflected because there is no restriction due to a film, unlike the case of a silver-salt film camera. From this standpoint, such a technique has been proposed that the image-pickup optical axis is deflected and an image-pickup face of the image-pickup element is inclined so that the length of the optical path for image pickup may be decreased and the dimension (thickness) of the electronic camera in its front-and-rear direction may be reduced. (See, e.g. U.S. patent application Ser. No. 09/145,540 filed on Sep. 2, 1998.)

There is an increasing demand for the reduction in size of the electronic camera, and the problem faced by apparatus designers is how to effectively use the limited spaced within the camera housing. In the case of the electronic camera of the above-mentioned type wherein the image-pickup face is inclined, however, a circuit board for mounting the image-pickup element is situated at an angle to the bottom surface of the housing. Consequently, a plurality of circuit boards cannot be arranged in a stacked manner. As has been described above, in the case of a electronic camera having a deflected optical system, the shape of the imaging optical system, which constitutes the main mechanism of the camera, greatly differs from the shape of an imaging optical system forming a linear optical system. It is thus required that the parts of the electronic camera be arranged more properly.

BRIEF SUMMARY OF THE INVENTION

The present invention has been made in consideration of the above problem, and its object is to provide an electronic camera having a deflected optical system, wherein the space within a camera housing is effectively used and the size of the camera can be reduced.

According to a first aspect of the present invention, there is provided an electronic camera comprising:

an imaging optical system for taking in a light beam from a subject along a first optical axis, deflecting the light beam along a second optical axis crossing the first optical axis, and focusing the light beam;

an image-pickup element for receiving the light beam focused by the imaging optical system, photoelectrically converting the light beam, and thus acquiring image data;

a first circuit board on which the image-pickup element is mounted; and a housing containing the image-pickup element and the first circuit board, wherein the first circuit board is disposed to extend in a plane oblique to a bottom surface of the housing, and an electronic component is disposed in a space defined between the first circuit board and the bottom surface of the housing.

According to a second aspect of the present invention, there is provided an electronic camera comprising:

an imaging optical system for taking in a light beam from a subject along a first optical axis, deflecting the light beam along a second optical axis crossing the first optical axis, and focusing the light beam;

an image-pickup element for receiving the light beam focused by the imaging optical system, photoelectrically converting the light beam, and thus acquiring image data;

a first circuit board on which the image-pickup element is mounted;

a second circuit board disposed on a side of the first circuit board, which is opposite to a side where the imaging optical system is provided;

an electronic component situated between the first circuit board and the second circuit board and mounted on the second circuit board; and a housing containing the image-pickup element, the first circuit board, the second circuit board and the electronic component, the second circuit board being disposed to extend in a plane substantially parallel to a bottom surface of the housing between the first circuit board and the bottom surface of the housing.

According to a third aspect of the present invention, there is provided an electronic camera comprising:

an imaging optical system for taking in a light beam from a subject along a first optical axis, deflecting the light beam along a second optical axis crossing the first optical axis, and focusing the light beam;

an image-pickup element for receiving the light beam focused by the imaging optical system, photoelectrically converting the light beam, and thus acquiring image data;

a first circuit board on which the image-pickup element is mounted, the first circuit board extending in a plane substantially perpendicular to the second optical axis;

a housing containing the image-pickup element and the first circuit board, the housing having a bottom surface and a rear surface, the first optical axis extending substantially in parallel to the bottom surface of the housing and substantially perpendicular to the rear surface of the housing; and an electronic component disposed in a space defined among the bottom surface of the housing, the rear surface of the housing and the first circuit board, the electronic component being selected from a group consisting of an input/output terminal for detachably attaching a cable for electrical connection with an external device, a condenser for flashing a strobe, and a recording medium interface for detachably attaching a memory for recording image data.

According to a fourth aspect of the present invention, there is provided an electronic camera comprising:

an imaging optical system for taking in a light beam from a subject along a first optical axis, deflecting the light beam along a second optical axis crossing the first optical axis, and focusing the light beam;

an image-pickup element for receiving the light beam focused by the imaging optical system, photoelectrically converting the light beam, and thus acquiring image data;

a first circuit board on which the image-pickup element is mounted, the first circuit board extending in a plane substantially perpendicular to the second optical axis;

a second circuit board disposed on a side of the first circuit board, which is opposite to a side where the imaging optical system is provided, the second circuit board extending in a plain which is substantially perpendicular to a plain including the first and second axes and is substantially parallel to the first optical axis;

an electronic component disposed between the first and second circuit boards, the electronic component being selected from a group consisting of an input/output terminal for detachably attaching a cable for electrical connection with an external device, a condenser for flashing a strobe, and a recording medium interface for detachably attaching a memory for recording image data; and a housing containing the image-pickup element, the first circuit board, the second circuit board and the electronic component.

According to the present invention, an electronic component, such as an input/output terminal for detachably attaching a cable for electrical connection with an external device, can be disposed by making effective use of a space formed when a circuit board for mounting an image-pickup element is provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a schematic side view showing a main part of an electronic camera according to a second embodiment of the present invention;

FIG. 7 is a schematic side view showing a main part of an electronic camera according to a third embodiment of the present invention;

FIG. 8 is a schematic side view showing a main part of an electronic camera according to a fourth embodiment of the present invention; and FIG. 9 is a schematic side view showing a main part of an electronic camera according to a fifth embodiment of the present invention.

DETAILED DESCRIPTION OF THE INVENTION

Figure 1A:
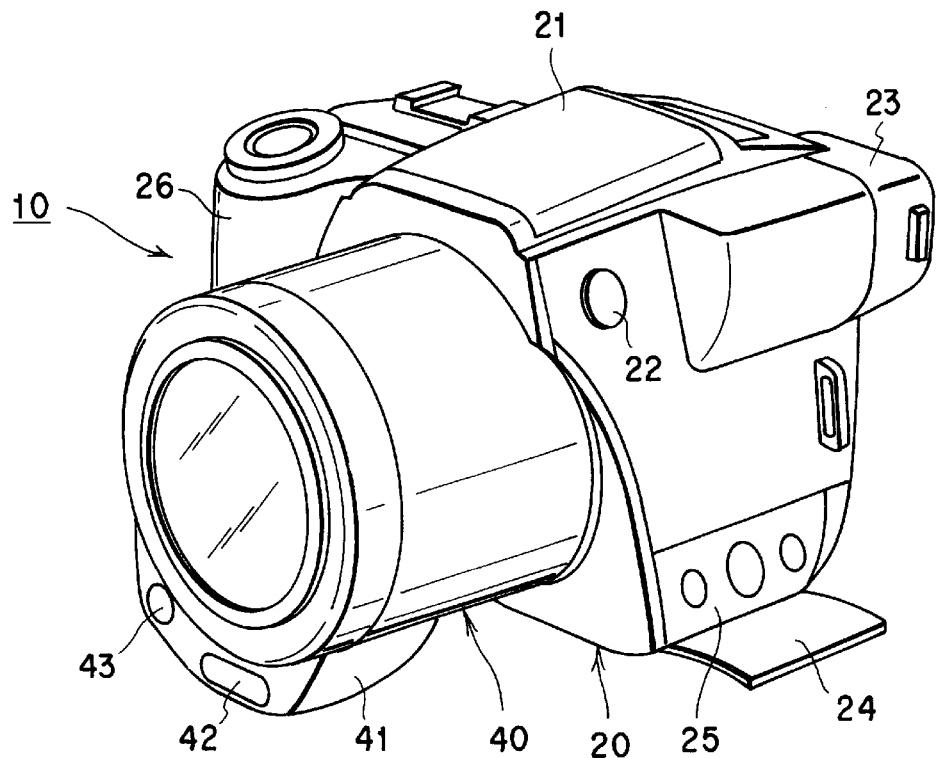
FIG. 1A and FIG. 1B are perspective views showing in different directions an electronic camera according to a first embodiment of the present invention.

Embodiments of the present invention will be described hereinafter with reference to the accompanying drawings. In the following description, the constituent elements having substantially the same function and arrangement are denoted by the same reference numerals, and a repetitive description will be made only when necessary.

As is shown in FIGS. 1A through 5, an electronic camera 10 according to a first embodiment of the present invention comprises a housing 20 and a lens barrel 40 attached to the housing 20.

Figure 1B:
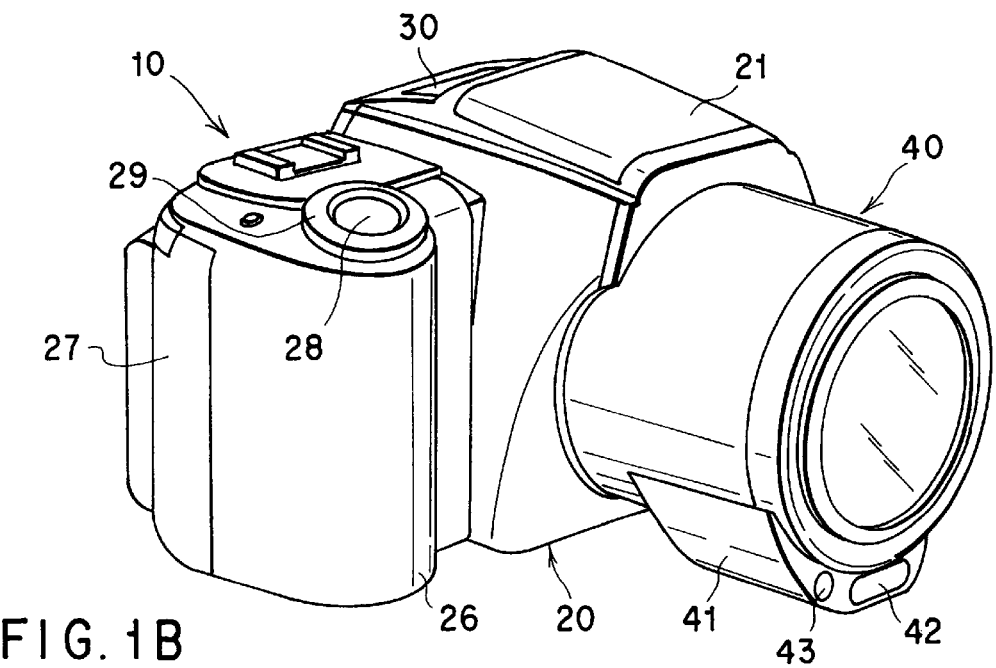
Figure 2:
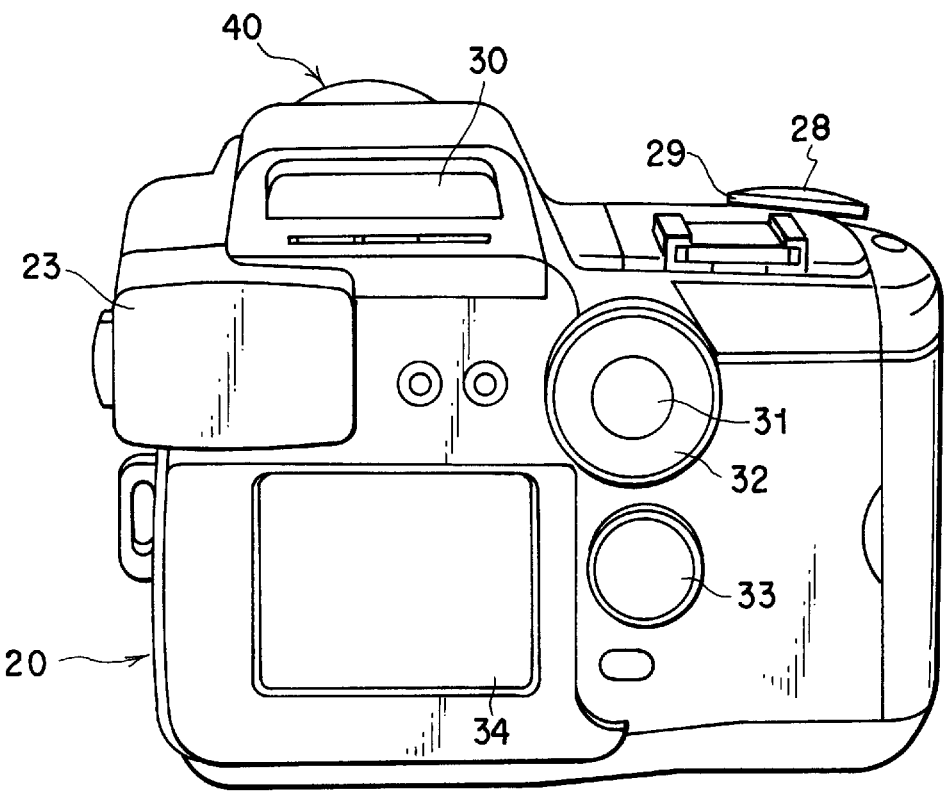
FIG. 2 is a rear view of the electronic camera.
Figure 3:
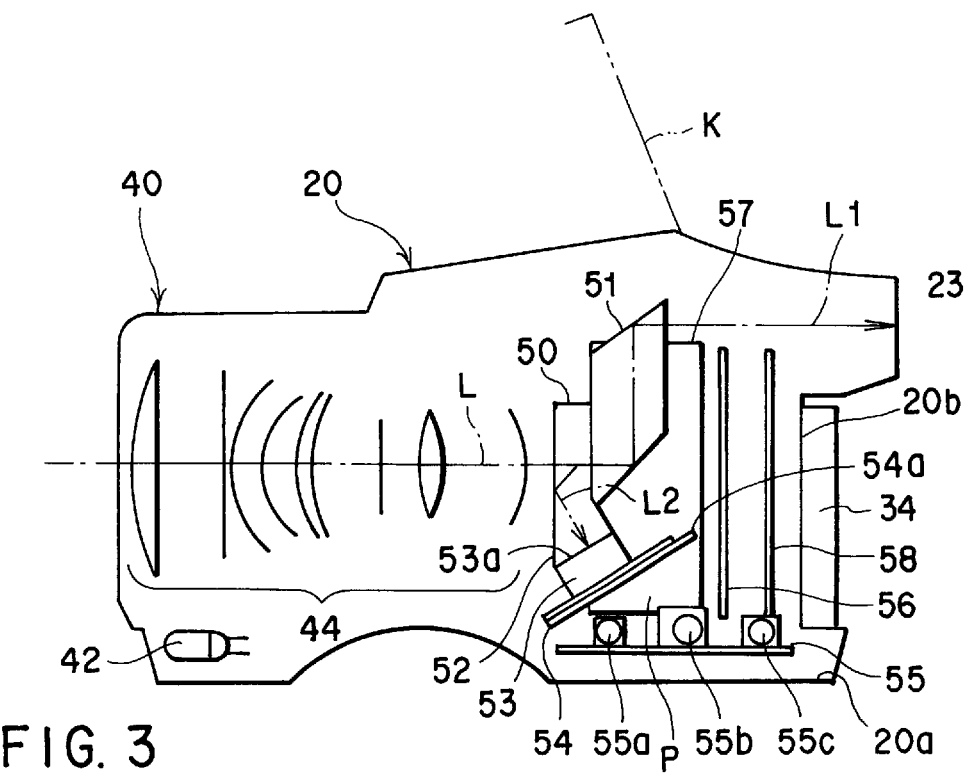
FIG. 3 is a schematic side view showing an arrangement of components of the electronic camera.
Figure 5:
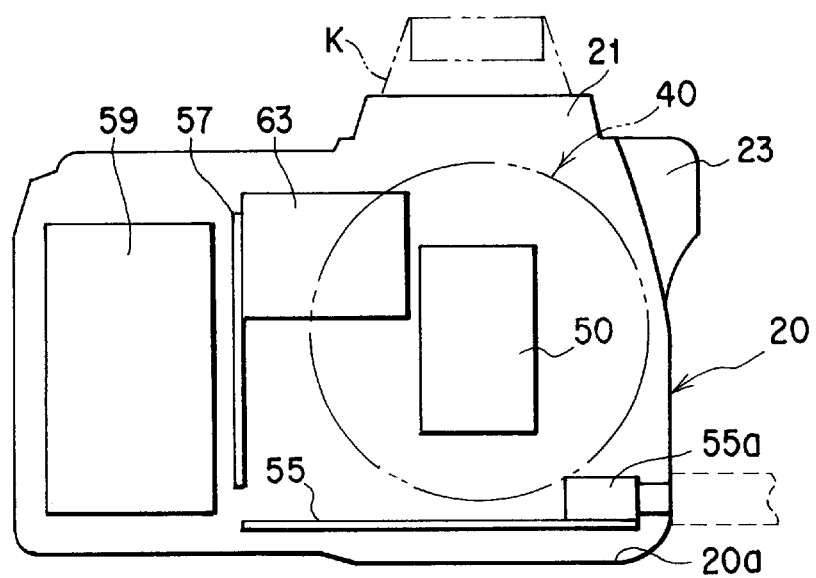
FIG. 5 is a schematic plan view showing an arrangement of components of the electronic camera.

The front, lateral and top sides of the electronic camera 10, as shown in FIGS. 1A and 1B, are provided with a pop-up strobe 21, a pot-up button 22, an optical finder 23, an input/output terminal cover 24, an input/output terminal section 25 (outside), a grip section 26, a card cover 27, a release switch 28, and a zoom switch 29. As is shown in FIG. 2, the rear side of the electronic camera 10 is provided with a mode display LCD 30, a power switch 31, a mode dial 32, a cursor key 33, and an image display LCD 34. In FIGS. 3 and 5, two-dot-and-dash lines K indicate the state in which the pop-up strobe is popped up. On the other hand, as shown in FIGS. 1A and 1B, a lens support member 41, an autofocus assist light emitter 42 and a remote-control window 43 are provided on a lower part of the peripheral surface of the lens barrel 40.

An image-pickup lens unit 44, which constitutes a front portion of an imaging optical system, is disposed within the lens barrel 40. On the other hand, as shown in FIG. 3, a beam splitter 50 for dividing a light beam L, which has passed through the image-pickup lens unit 44, into light beams L1 and L2, is disposed within the housing 20. In addition, an optical system component 51 for guiding the light beam L1 to the optical finder 23 and an optical system component 52 for guiding the light beam L2 are provided within the housing 20. The light beam L2 is focused by the optical system component 52 onto a light-receiving face 53a of an image-pickup element 53 mounted on an image-pickup board (first circuit board) 54. An image-pickup circuit unit 54a is disposed on the image-pickup board 54.

The image-pickup lens unit 44, beam splitter 50 and optical system component 52 constitute the imaging optical system for taking in a light beam from a subject along a first optical axis, deflecting the beam along a second optical axis crossing the first optical axis, and focusing the beam. Specifically, in the imaging optical system, the light beam L2 to the image-pickup element 53 is made oblique to the light beam L taken in from the subject, whereby the length of the electronic camera 10 in the front-and-rear direction can be reduced.

The housing 20 has a bottom surface 20a and a rear surface 20b which extend at substantially right angles with each other. The first optical axis, which is defined by the optical system components of the image-pickup lens unit 44 for taking in the light beam L from the subject, is substantially parallel to the bottom surface 20a of the housing 20 and substantially perpendicular to the rear surface 20b.

An angle of from 10 to 80° is formed between the first optical axis defined by the optical system components of the image-pickup lens unit 44 and the second optical axis defined by the optical system component 52 for focusing the light beam L2 onto the image-pickup component 53. The image-pickup board 54 on which the image-pickup element 53 is mounted is disposed to extend in a plane substantially perpendicular to the second optical axis defined by the optical system component 52. Accordingly, an angle of from 10 to 80° is formed between the image-pickup board 54 and the bottom surface 20a of housing 20.

An oblique space P having a vertical cross section of a substantially right-angled triangular shape is thus defined by the bottom surface 20a and rear surface 20b of housing 20 and the image-pickup board 54. An input/output board (second circuit board) 55 is disposed between the oblique space P and the bottom surface 20a of housing 20 so as to extend in a plane substantially parallel to the bottom surface 20a. Specifically, an angle of from 10 to 80° is formed between the image-pickup board 54 and the input/output board 55. In other words, the input/output board 55 extends in a plane which is substantially perpendicular to a plane including the first and second optical axes of the imaging optical system and is substantially parallel to the first optical axis.

A serial communication terminal 55a, an external power input terminal 55b and a video-out terminal 55c, which are input/output terminals, are mounted on the input/output board 55. These relatively large serial communication terminal 55a, external power input terminal 55b and video-out terminal 55c are disposed in the oblique space P.

A main board (third circuit board) 56 and a sub-main board (fifth circuit board) 58, which extend in planes substantially perpendicular to the bottom surface 20a and substantially parallel to the rear surface 20b, are disposed between the image-pick board 54 and the rear surface 20b of housing 20. In other words, the main board 56 and sub-main board 58 extend in planes substantially perpendicular to the first optical axis of the imaging optical system.

In addition, a strobe board (fourth circuit board) 57, which extends in a plane substantially perpendicular to the bottom surface 20a and rear surface 20b, is disposed beside the image-pickup board 54 and main board 56. In other words, the strobe board 57 extends in a plane substantially parallel to a plane including the first and second axes of the imaging optical system.

Figure 4:
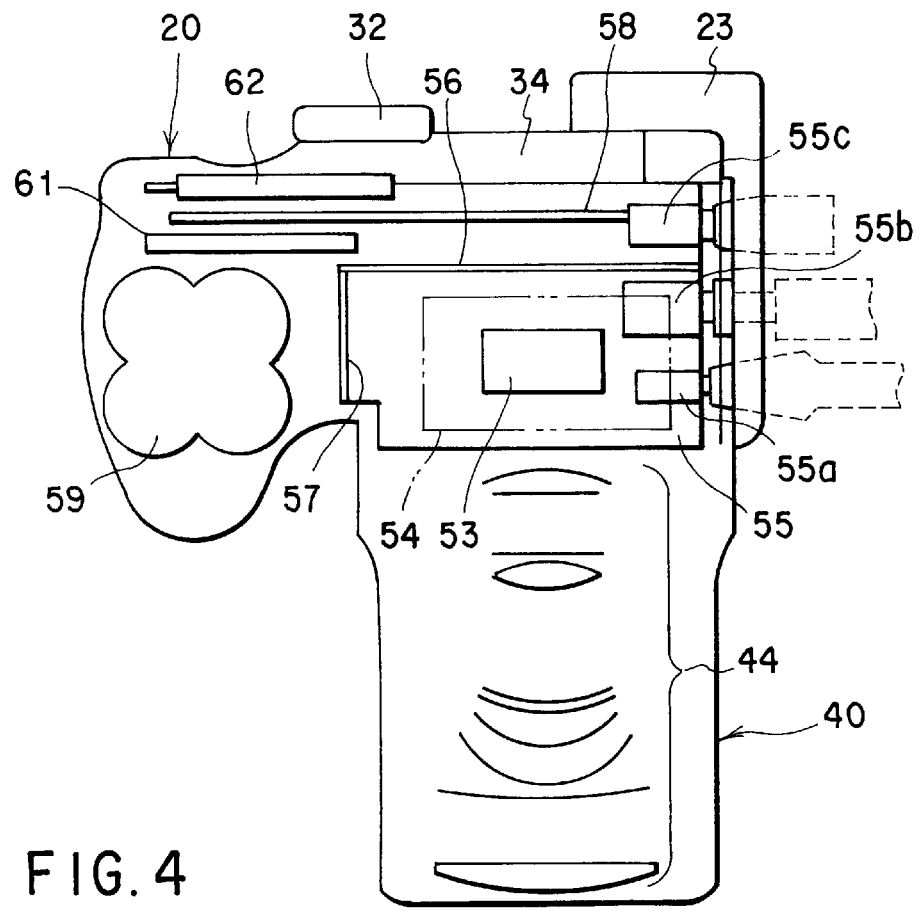
FIG. 4 is a schematic plan view showing an arrangement of components of the electronic camera.

As is shown in FIGS. 4 and 5, a strobe condenser 63 for flashing the strobe 21 is disposed on an upper portion of the strobe board 57 at a location above the oblique space P. A battery room 59 is arranged on a side of the strobe board 57 within the housing 20, which is opposite to the side on which the strobe condenser 63 and oblique space P are provided. A first medium slot 61 for receiving a compact flash, or a recording medium, and a second medium slot 62 for receiving smart media, or recording media, are provided between the battery room 59 and the rear surface of the housing 20.

In the electronic camera 10 thus constructed, relatively large electronic components, i.e. the serial communication terminal 55a, external power input terminal 55b and video-out terminal 55c, are disposed in the oblique space P. Accordingly, the efficiency of use of space can be enhanced and the size of the electronic camera 10 reduced.

FIG. 6 is a schematic side view showing a main part of an electronic camera 70 according to a second embodiment of the present invention. In this embodiment, a third medium slot (recording medium interface) 71 for receiving a PC card, or a recording medium, is mounted on the input/output board 55. The third medium slot 71, which is a relatively large electronic component, is disposed in a region surrounded by the three boards 54, 55 and 56 within the oblique space P.

With the electronic camera 70 according to the second embodiment, like the electronic camera 10 according to the first embodiment, the efficiency of use of space can be enhanced and the size of the electronic camera 10 reduced.

FIG. 7 is a schematic side view showing a main part of an electronic camera 80 according to a third embodiment of the present invention. In this embodiment, a serial communication terminal 56a and an external power input terminal 56b, which are input/output terminals, are mounted on the main board 56. These relatively large serial communication terminal 56a and external power input terminal 56b are disposed in a region surrounded by the three boards 54, 55 and 56 within the oblique space P.

With the electronic camera 80 according to the third embodiment, like the electronic camera 10 according to the first embodiment, the efficiency of use of space can be enhanced and the size of the electronic camera 10 reduced.

FIG. 8 is a schematic side view showing a main part of an electronic camera 90 according to a fourth embodiment of the present invention. In this embodiment, the strobe condenser 63 is mounted on the main board 56. The strobe condenser 63, which is a relatively large electronic component, is disposed in a region surrounded by the three boards 54, 55 and 56 within the oblique space P.

With the electronic camera 90 according to the fourth embodiment, like the electronic camera 10 according to the first embodiment, the efficiency of use of space can be enhanced and the size of the electronic camera 10 reduced.

FIG. 9 is a schematic side view showing a main part of an electronic camera 100 according to a fifth embodiment of the present invention. In this embodiment, the strobe condenser 63 is mounted on the strobe board 57. The strobe condenser 63, which is a relatively large electronic component, is disposed in a region surrounded by the four boards 54, 55, 56 and 57 within the oblique space P.

With the electronic camera 100 according to the fifth embodiment, like the electronic camera 10 according to the first embodiment, the efficiency of use of space can be enhanced and the size of the electronic camera 10 reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;
   a single image-pickup element for receiving the primary light beam focused by the imaging optical system, photoelectrically converting the primary light beam, and thus acquiring image data;
   a first circuit board on which the image-pickup element is mounted; and
   a housing containing the image-pickup element and the first circuit board,
   wherein the first circuit board is disposed to extend in a plane oblique to a bottom surface of the housing, and an electronic component is disposed in a space defined between the first circuit board and the bottom surface of the housing.

2. An electronic camera according to claim 1, further comprising a second circuit board disposed within the housing between the first circuit board and the bottom surface of the housing, the second circuit board extending in a plane substantially parallel to the bottom surface of the housing, said electronic component being mounted on the second circuit board.

3. An electronic camera according to claim 1, further comprising another circuit board disposed on a side of the first circuit board within the housing, which is opposite to a side where the imaging optical system is provided, said another circuit board extending in a plane substantially perpendicular to the bottom surface of the housing, said electronic component being mounted on said another circuit board.

4. An electronic camera according to claim 1, wherein said electronic component is an input/output terminal for detachably attaching a cable for electrical connection with an external device.

5. An electronic camera according to claim 1, wherein said electronic component is one of a condenser for flashing a strobe, and a recording medium interface for detachably attaching a memory for recording image data.

6. An electronic camera comprising:
- an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;
- a single image-pickup element for receiving the primary light beam focused by the imaging optical system, photoelectrically converting the primary light beam, and thus acquiring image data;
- a first circuit board on which the image-pickup element is mounted;
- a second circuit board disposed on a side of the first circuit board, which is opposite to a side where the imaging optical system is provided;
- an electronic component provided between the first circuit board and the second circuit board and mounted on the second circuit board; and
- a housing containing the image-pickup element, the first circuit board, the second circuit board and the electronic component,
- wherein the second circuit board is disposed to extend in a plane substantially parallel to a bottom surface of the housing between the first circuit board and the bottom surface of the housing, and said first circuit board is disposed to extend in a plane oblique to the bottom surface of the housing.

7. An electronic camera according to claim 6, further comprising a third circuit board disposed on a side of the first circuit board within the housing, which is opposite to a side where the imaging optical system is provided, said third circuit board extending in a plane substantially perpendicular to the bottom surface of the housing, and said electronic component being disposed in a region surrounded by the first, second and third circuit boards.

8. An electronic camera according to claim 6, further comprising a battery room defined within the housing, wherein a plane including the first and second optical axes lies between the electronic component and the battery room.

9. An electronic camera according to claim 6, wherein said electronic component is an input/output terminal for detachably attaching a cable for electrical connection with an external device.

10. An electronic camera comprising:
- an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;
- a single image-pickup element for receiving the primary light beam focused by the imaging optical system, photoelectrically converting the primary light beam, and thus acquiring image data;
- a first circuit board on which the image-pickup element is mounted, the first circuit board extending in a plane substantially perpendicular to the second optical axis;
- a housing containing the image-pickup element and the first circuit board, the housing having a bottom surface and a rear surface, said first optical axis extending substantially in parallel to the bottom surface of the housing and substantially perpendicular to the rear surface of the housing, and said first circuit board being disposed to extend in a plane oblique to the bottom surface of the housing; and
- an electronic component disposed in a space defined among the bottom surface of the housing, the rear surface of the housing and the first circuit board, said electronic component being selected from a group consisting of an input/output terminal for detachably attaching a cable for electrical connection with an external device, a condenser for flashing a strobe, and a recording medium interface for detachably attaching a memory for recording image data.

11. An electronic camera according to claim 10, further comprising a second circuit board disposed within the housing between the first circuit board and the bottom surface of the housing, the second circuit board extending in a plane substantially parallel to the bottom surface of the housing, and said electronic component being disposed between the first and second circuit boards.

12. An electronic camera according to claim 11, further comprising a third circuit board disposed within the housing between the first circuit board and the rear surface of the housing, the third circuit board extending in a plane substantially parallel to the rear surface of the housing, and said electronic component being disposed in a region surrounded by the first, second and third circuit boards.

13. An electronic camera according to claim 12, further comprising a fourth circuit board disposed within the housing and extending in a plane substantially perpendicular to the bottom surface and the rear surface of the housing, said electronic component being disposed in a region surrounded by the first, second, third and fourth circuit boards.

14. An electronic camera according to claim 10, wherein an angle of from 10 to 80° is formed between the first circuit board and the bottom surface of the housing.

15. An electronic camera according to claim 10, further comprising a battery room defined within the housing, wherein a plane including the first and second optical axes lies between the electronic component and the battery room.

16. An electronic camera comprising:
- an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;
- a single image-pickup element for receiving the primary light beam focused by the imaging optical system, photoelectrically converting the primary light beam, and thus acquiring image data;
- a first circuit board on which the image-pickup element is mounted, the first circuit board extending in a plane substantially perpendicular to the second optical axis;
- a second circuit board disposed on a side of the first circuit board, which is opposite to a side where the imaging optical system is provided, the second circuit board extending in a plain which is substantially perpendicular to a plain including the first and second axes and is substantially parallel to the first optical axis;
- an electronic component disposed between the first and second circuit boards, the electronic component being selected from a group consisting of an input/output terminal for detachably attaching a cable for electrical connection with an external device, a condenser for flashing a strobe, and a recording medium interface for detachably attaching a memory for recording image data; and a housing containing the image-pickup element, the first circuit board, the second circuit board and the electronic component;

wherein said first circuit board is disposed to extend in a plane oblique to a bottom surface of the housing.

17. An electronic camera according to claim 16, wherein an angle of from 10 to 80° is formed between the first and second circuit boards.

18. An electronic camera according to claim 16, wherein the electronic component is mounted on the second circuit board.

19. An electronic camera according to claim 16, further comprising a third circuit board disposed on a side of the first circuit board within the housing, which is opposite to a side where the imaging optical system is provided, said third circuit board extending in a plane substantially perpendicular to the first optical axis, and said electronic component being mounted on the third circuit board.

20. An electronic camera comprising:

an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;

a single image-pickup element for receiving the primary light beam focused by the imaging optical system, photoelectrically converting the primary light beam, and thus acquiring image data;

a first circuit board on which the image-pickup element is mounted;

a second circuit board disposed on a side of the first circuit board, which is opposite to a side where the imaging optical system is provided;

an electronic component provided between the first circuit board and the second circuit board and mounted on the second circuit board;

a housing containing the image-pickup element, the first circuit board, the second circuit board and the electronic component, the second circuit board being disposed to extend in a plane substantially parallel to a bottom surface of the housing between the first circuit board and the bottom surface of the housing; and a battery room defined within the housing, wherein a plane including the first and second optical axes lies between the electronic component and the battery room.

21. An electronic camera according to claim 20, further comprising a third circuit board disposed on a side of the first circuit board within the housing, which is opposite to a side where the imaging optical system is provided, said third circuit board extending in a plane substantially perpendicular to the bottom surface of the housing, and said electronic component being disposed in a region surrounded by the first, second and third circuit boards.

22. An electronic camera according to claim 20, wherein said first circuit board is disposed to extend in a plane oblique to the bottom surface of the housing.

23. An electronic camera according to claim 20, wherein said electronic component is an input/output terminal for detachably attaching a cable for electrical connection with an external device.

24. An electronic camera comprising:

an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;

a single image-pickup element for receiving the primary light beam focused by the imaging optical system, photoelectrically converting the primary light beam, and thus acquiring image data;

a first circuit board on which the image-pickup element is mounted;

a second circuit board disposed on a side of the first circuit board, which is opposite to a side where the imaging optical system is provided;

an electronic component provided between the first circuit board and the second circuit board and mounted on the second circuit board; and a housing containing the image-pickup element, the first circuit board, the second circuit board and the electronic component, the second circuit board being disposed to extend in a plane substantially parallel to a bottom surface of the housing between the first circuit board and the bottom surface of the housing;

wherein said electronic component is an input/output terminal for detachably attaching a cable for electrical connection with an external device.

25. An electronic camera according to claim 24, further comprising a third circuit board disposed on a side of the first circuit board within the housing, which is opposite to a side where the imaging optical system is provided, said third circuit board extending in a plane substantially perpendicular to the bottom surface of the housing, and said electronic component being disposed in a region surrounded by the first, second and third circuit boards.

26. An electronic camera according to claim 24, wherein said first circuit board is disposed to extend in a plane oblique to the bottom surface of the housing.

27. An electronic camera comprising:

an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;

a single image-pickup element for receiving the primary light beam focused by the imaging optical system, photoelectrically converting the primary light beam, and thus acquiring image data;

a first circuit board on which the image-pickup element is mounted, the first circuit board extending in a plane substantially perpendicular to the second optical axis;

a housing containing the image-pickup element and the first circuit board, the housing having a bottom surface and a rear surface, said first optical axis extending substantially in parallel to the bottom surface of the housing and substantially perpendicular to the rear surface of the housing;

an electronic component disposed in a space defined among the bottom surface of the housing, the rear surface of the housing and the first circuit board, said electronic component being selected from a group consisting of an input/output terminal for detachably attaching a cable for electrical connection with an external device, a condenser for flashing a strobe, and a recording medium interface for detachably attaching a memory for recording image data;

a second circuit board disposed within the housing between the first circuit board and the bottom surface of the housing, the second circuit board extending in a plane substantially parallel to the bottom surface of the housing, and said electronic component being disposed between the first and second circuit boards;

a third circuit board disposed within the housing between the first circuit board and the rear surface of the housing, the third circuit board extending in a plane substantially parallel to the rear surface of the housing, and said electronic component being disposed in a region surrounded by the first, second and third circuit boards; and a fourth circuit board disposed within the housing and extending in a plane substantially perpendicular to the bottom surface and the rear surface of the housing, said electronic component being disposed in a region surrounded by the first, second, third and fourth circuit boards.

28. An electronic camera according to claim 27, wherein an angle of from 10 to 80° is formed between the first circuit board and the bottom surface of the housing.

29. An electronic camera according to claim 27, further comprising a battery room defined within the housing, wherein a plane including the first and second optical axes lies between the electronic component and the battery room.

30. An electronic camera comprising:

an imaging optical system for taking in a light beam from a subject along a first optical axis, dividing the light beam into a primary light beam and a secondary light beam, deflecting the primary light beam along a second optical axis crossing the first optical axis, focusing the primary light beam, and guiding the secondary light beam to an optical finder;

a single image-pickup element for receiving the primary light beam focused by the imaging optical system, photoelectrically converting the primary light beam, and thus acquiring image data;

a first circuit board on which the image-pickup element is mounted, the first circuit board extending in a plane substantially perpendicular to the second optical axis;

a housing containing the image-pickup element and the first circuit board, the housing having a bottom surface and a rear surface, said first optical axis extending substantially in parallel to the bottom surface of the housing and substantially perpendicular to the rear surface of the housing;

an electronic component disposed in a space defined among the bottom surface of the housing, the rear surface of the housing and the first circuit board, said electronic component being selected from a group consisting of an input/output terminal for detachably attaching a cable for electrical connection with an external device, a condenser for flashing a strobe, and a recording medium interface for detachably attaching a memory for recording image data; and a battery room defined within the housing, wherein a plane including the first and second optical axes lies between the electronic component and the battery room.

31. An electronic camera according to claim 30, further comprising a second circuit board disposed within the housing between the first circuit board and the bottom surface of the housing, the second circuit board extending in a plane substantially parallel to the bottom surface of the housing, and said electronic component being disposed between the first and second circuit boards.

32. An electronic camera according to claim 31, further comprising a third circuit board disposed within the housing between the first circuit board and the rear surface of the housing, the third circuit board extending in a plane substantially parallel to the rear surface of the housing, and said electronic component being disposed in a region surrounded by the first to third circuit boards.

33. An electronic camera according to claim 30, wherein an angle of from 10 to 80° is formed between the first circuit board and the bottom surface of the housing.

* * * * *